(No Model.)　　　　　　C. F. BRUSH.　　　　2 Sheets—Sheet 1.
SECONDARY BATTERY.

No. 337,298.　　　　　　　　Patented Mar. 2, 1886.

WITNESSES　　　　　　Charles F. Brush, INVENTOR
　　　　　　　　By Liggett & Liggett
　　　　　　　　　　　　ATTORNEYS (No Model.) 2 Sheets—Sheet 2.

C. F. BRUSH.
SECONDARY BATTERY.

No. 337,298. Patented Mar. 2, 1886.

WITNESSES
Jas. E. Hutchinson
S. G. Nottingham

INVENTOR
Chas. F. Brush.
By Leggett & Leggett
Attorney

UNITED STATES PATENT OFFICE.

CHARLES F. BRUSH, OF CLEVELAND, OHIO.

SECONDARY BATTERY.

SPECIFICATION forming part of Letters Patent No. 337,298, dated March 2, 1886.

Application filed June 13, 1881. Serial No. 35,567. (No model.)

*To all whom it may concern:*

Be it known that I, CHARLES F. BRUSH, of Cleveland, in the county of Cuyahoga and State of Ohio, have invented certain new and useful Improvements in Secondary Batteries, (Case I;) and I do hereby declare the following to be a full, clear, and exact description of the invention, such as will enable others skilled in the art to which it pertains to make and use it, reference being had to the accompanying drawings, which form part of this specification.

My invention, which for reference and distinction from other similar inventions covered by applications for Letters Patent filed June 9, 1881, I shall distinguish as "Case I," relates to secondary batteries or current-storing apparatus; and it consists in a plate or support provided with a mechanically-applied coating of absorptive substance adapted to be transformed into an active coating.

It further consists in a plate or support provided with a mechanically-applied coating of granulated or spongy or porous metallic lead.

It further consists in the method of constructing plates or elements for secondary batteries, consisting in mechanically coating lead or other suitable plates with an absorptive substance adapted to be transformed into an active coating.

Figure 1:
Figure 2:
Figure 3:
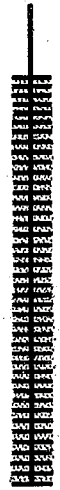
Figure 4:
Figure 5:
Figure 6:
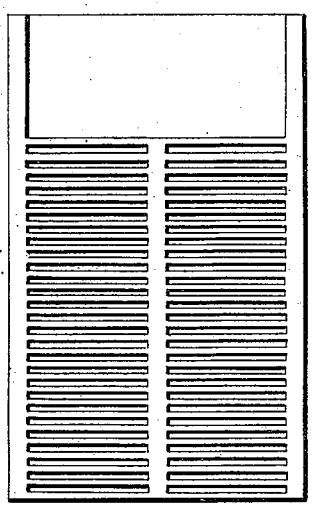
Figure 8:
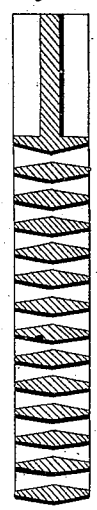
Figure 7:
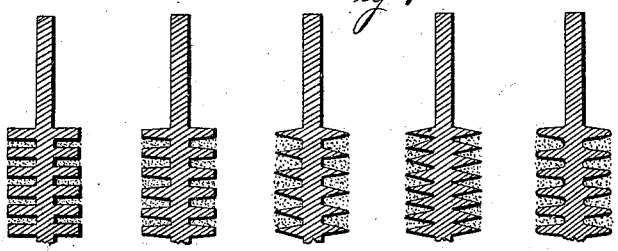
Figure 9:
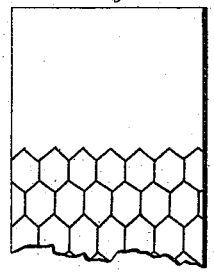
Figure 10:
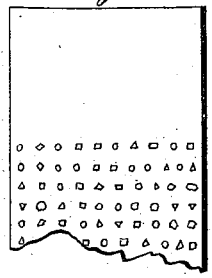
Figure 11:

In the accompanying drawings, Figure 1 is a vertical section or end view of a plain plate coated according to my invention. Fig. 2 represents a corrugated plate thus coated. Fig. 3 illustrates a ribbed plate likewise prepared. Fig. 4 shows an angular corrugated plate. Fig. 5 illustrates two corrugated plates, the ribs of one plate entering the grooves or depressions of the other. Fig. 6 is a top and plan view of a ribbed plate. Fig. 7 represents different forms of ribbed plates. Fig. 8 shows a vertical section of a ribbed plate provided with slots or perforations extending through the plate. Fig. 9 represents a honey-combed plate. Fig. 10 shows a studded plate, and Fig. 11 shows a ribbed corrugated plate.

In Fig. 1, *a* is a plain plate of lead or other suitable metal. *b* is a sheet of heavy paper or card-board, or of cloth or felt or equivalent substance, between which and the plate *a* is the coating of granular or porous lead, (represented by the dotted space.) The paper is used to retain the porous lead in position, and is secured to the plate in any suitable manner—as by ties, rivets, or binding-strips of metal or wood. (Not shown.) The granular or porous lead may be spread on the plate, placed horizontally for the purpose, and consolidated and made to adhere to the plate by placing the whole between two plates of iron and applying pressure by hydraulic or other means. When thus applied to a lead plate, the porous metal will retain its position without the paper or felt *b*, and will also be found more efficient in use. Both sides of the plate *a* may be treated with the porous metal.

Fig. 2 shows a corrugated plate having its corrugations filled with the granular or spongy lead. Paper or felt may here be used, as before, to retain the material in place; but if the latter is rammed or pressed into the corrugations no such support will be found necessary.

Figs. 3, 4, 5, 6, 7, 8, 9, 10, and 11 represent ribbed, corrugated, perforated, studded, and cellular plates treated in the same manner as has been described in connection with the corrugated plate, Fig. 2.

Large plain plates, or even corrugated and ribbed plates, after being treated with porous or granular lead, may be separated by sheets of porous non-conducting material, or by sufficiently numerous strips of non-conducting material, and then rolled up into a "cylindrical spiral" form.

When a pair of plates such as I have described are associated together to form a secondary battery, and immersed in dilute sulphuric acid and charged by the passage of an electric current in the usual manner, one of the plates absorbs a large quantity of hydrogen, while the other plate has its spongy or granular portion peroxidized, and thus forms the oxygen element of the battery. The hydrogen or unchanged plate is apt, however, to deteriorate by use, and better results may often be attained by peroxidizing both the plates and afterward reversing or reducing one of them to form the hydrogen element of the battery, as described in my application designated as "Case A," and in Division A, on which were granted Letters Patent No. 264,211, September 12, 1882.

The granular or spongy or porous lead referred to may be prepared by chemical or electrical reduction of a lead compound, or by mechanically subdividing metallic lead.

Having fully described my invention, what I claim as new, and desire to secure by Letters Patent, is—

1. A suitable plate or support provided with mechanically-applied absorptive substance and adapted for use as a secondary-battery element or electrode after being rendered active by an electric current, substantially as set forth.

2. An improvement in the construction of secondary-battery elements or electrodes, said improvement consisting in suitable plates or supports primarily coated or combined with mechanically-applied porous, granular, spongy, or equivalent lead, substantially as set forth.

3. An improvement in the construction of a secondary-battery element or electrode, said improvement consisting in a corrugated lead or other plate primarily coated, combined, or filled with mechanically-applied absorptive substance, substantially as set forth.

4. An improvement in the construction of a secondary-battery element or electrode, said improvement consisting in a corrugated lead or other plate primarily coated, combined, or filled with mechanically-applied porous, granular, spongy, or equivalent lead, substantially as set forth.

5. An improvement in the construction of a secondary-battery element or electrode, said improvement consisting in a plate or suitable support provided with grooves, receptacles, or perforations primarily coated, combined, or filled with mechanically-applied absorptive substance, substantially as set forth.

6. An improvement in the construction of a secondary-battery element or electrode, said improvement consisting in a plate or support provided with grooves, receptacles, or perforations primarily coated, combined, or filled with mechanically-applied porous, granular, spongy, or equivalent lead, substantially as set forth.

7. The combination, with the plate $a$, primarily coated, combined, or filled with mechanically-applied porous or equivalent lead, of the retaining cover or sheet $b$, of suitable porous material, substantially as set forth.

8. In the process of making plates or elements for secondary batteries, primarily and mechanically applying to or combining with a suitable plate or support an absorptive substance adapted to be transformed into active material, substantially as set forth.

9. In the process of making plates or elements for secondary batteries, primarily applying to or combining with a suitable plate or support porous, granular, spongy, or equivalent lead, substantially as set forth.

10. In the process of making a secondary-battery plate or element, combining by means of pressure an absorptive substance and suitable material to form a support therefor, substantially as set forth.

11. In the process of making a secondary-battery plate or element, constructing a suitable plate or support with grooves, cells, receptacles, or perforations, said plate or support having an absorptive substance primarily applied thereto or combined therewith, substantially as set forth.

12. Absorptive material for use in secondary batteries formed into a coherent mass by pressure, substantially as set forth.

13. For use in secondary batteries, porous, granular, spongy, or equivalent lead formed into a coherent mass by pressure, substantially as set forth.

In testimony whereof I have signed my name to this specification in the presence of two subscribing witnesses.

CHARLES F. BRUSH.

Witnesses:
JNO. CROWELL, Jr.,
ALBERT E. LYNCH.